United States Patent

Takahashi et al.

Patent Number: 5,574,607
Date of Patent: Nov. 12, 1996

[54] MAGNETIC DISK CARTRIDGE

[75] Inventors: Keizo Takahashi; Kunihiro Hyakutake; Hisayoshi Oshima, all of Tochigi-ken, Japan

[73] Assignee: Kao Corporation, Tokyo, Japan

[21] Appl. No.: 340,489

[22] Filed: Nov. 15, 1994

Related U.S. Application Data

[63] Continuation of Ser. No. 92,069, Jul. 16, 1993, abandoned.

[30] Foreign Application Priority Data

Aug. 28, 1992 [JP] Japan .................................. 4-230418

[51] Int. Cl.$^6$ .................................................. G11B 23/03
[52] U.S. Cl. ................................................................ 360/133
[58] Field of Search .................................... 360/133, 132, 360/134; 369/282, 286, 290, 288, 291

[56] References Cited

U.S. PATENT DOCUMENTS

| | | | |
|---|---|---|---|
| 4,713,061 | 12/1987 | Tarello et al. | 604/200 |
| 4,907,822 | 3/1990 | Carter et al. | 281/15.1 |
| 5,188,875 | 2/1993 | Yamaoka et al. | 428/64 |
| 5,219,708 | 6/1993 | Hirata et al. | 369/288 |
| 5,318,653 | 6/1994 | Toide et al. | 156/295 |
| 5,340,698 | 8/1994 | Hirata et al. | 369/288 |

FOREIGN PATENT DOCUMENTS

| | | |
|---|---|---|
| 61-115283 | 6/1986 | Japan . |
| 61-204883 | 9/1986 | Japan . |
| 61-242378 | 10/1986 | Japan . |
| 62-298040 | 12/1987 | Japan . |
| 2306485 | 12/1990 | Japan . |
| 312084 | 1/1991 | Japan . |

*Primary Examiner*—John H. Wolff
*Assistant Examiner*—Allen Cao
*Attorney, Agent, or Firm*—Birch, Stewart, Kolasch & Birch, LLP

[57] ABSTRACT

The magnetic disk cartridge of the present invention comprises a cartridge frame and, freely rotatably disposed therein, a magnetic disk comprising a magnetic recording medium and a hub provided at the center of the medium, wherein the hub is bonded to the medium with a moisture-curable urethane hot-melt adhesive.

4 Claims, 1 Drawing Sheet

MAGNETIC DISK CARTRIDGE

This application is a continuation of application Ser. No. 08/092,069 filed on Jul. 16, 1993, now abandoned.

BACKGROUND OF THE INVENTION

1. Field of the Invention

The present invention relates to a magnetic disk cartridge comprising a cartridge frame and, freely rotatably disposed therein, a magnetic disk.

2. Description of the Prior Art

The magnetic disk of a magnetic disk cartridge comprises a medium and a hub. The medium is made from a flexible resin film which has a magnetic recording material bonded to the surface thereof via a binder or the like. The hub is provided at the center of a doughnut-shaped medium, and has an aperture through which the hub engages with a spindle or the like of a device. The hub is generally made from metal, hard plastic or the like.

In the assembly of a magnetic disk, the bonding of the hub to the medium has been performed using an acrylic double coated adhesive film known in the art as the A ring or using a rubber hot-melt adhesive from the viewpoint of the ease of operations.

The conventional magnetic disk cartridges, however, have a danger such that the adhesive strength between the hub and the medium is lowered causing slippage to occur therebetween when the magnetic disk is left or used in a high-temperature environment.

Although the use of a two-pack reaction type adhesive (acrylic) which exhibits an excellent adhesive strength even in a high-temperature environment, has been examined, the use of such an adhesive has a danger such that the initial bonding strength (at the time of bonding the hub to the medium) of the adhesive is so poor that slippage occurs between the hub and the medium at the time of assembly.

SUMMARY OF THE INVENTION

Accordingly, it is an object of the present invention to provide a magnetic disk cartridge in which the adhesive strength between the hub and the medium is excellent not only immediately after the bonding of the hub to the medium, but also later while being left in a high-temperature environment, so that the magnetic disk cartridge is highly reliable with respect to data reading and data writing onto the magnetic disk.

Essentially, according to the present invention, there is provided a magnetic disk cartridge comprising a cartridge frame and, freely rotatably disposed therein, a magnetic disk comprising a magnetic recording medium and a hub provided at the center of the medium, wherein the hub is bonded to the medium with a moisture-curable urethane hot-melt adhesive. By this magnetic disk cartridge, the object of the present invention has been attained.

When the hub is bonded to the medium with a moisture-curable urethane hot-melt adhesive, a chemical secondary bond or the like is formed between the isocryanate groups of the adhesive and the active hydrogen or the like present on the surfaces of the medium and the hub, due to the high polarity and reactivity of the isocyanate groups. Accordingly, the adhesive strength between the hub and the medium is excellent, not only immediately after the bonding of the hub to the medium, but also later while being left in a high-temperature environment. When the adhesive strength between the hub and the medium is high just after the assembly thereof, there is a decrease in the occurrence of defective products. In addition, when the adhesive strength between the hub and the medium is high in a high-temperature environment, neither faulty data reading nor faulty data writing occurs due to slippage of the hub, even in a high-temperature adverse environment.

DETAILED DESCRIPTION OF THE INVENTION

Hereinbelow, one example of a magnetic disk cartridge according to the present invention will be described with reference to the attached drawings.

Figure 1:
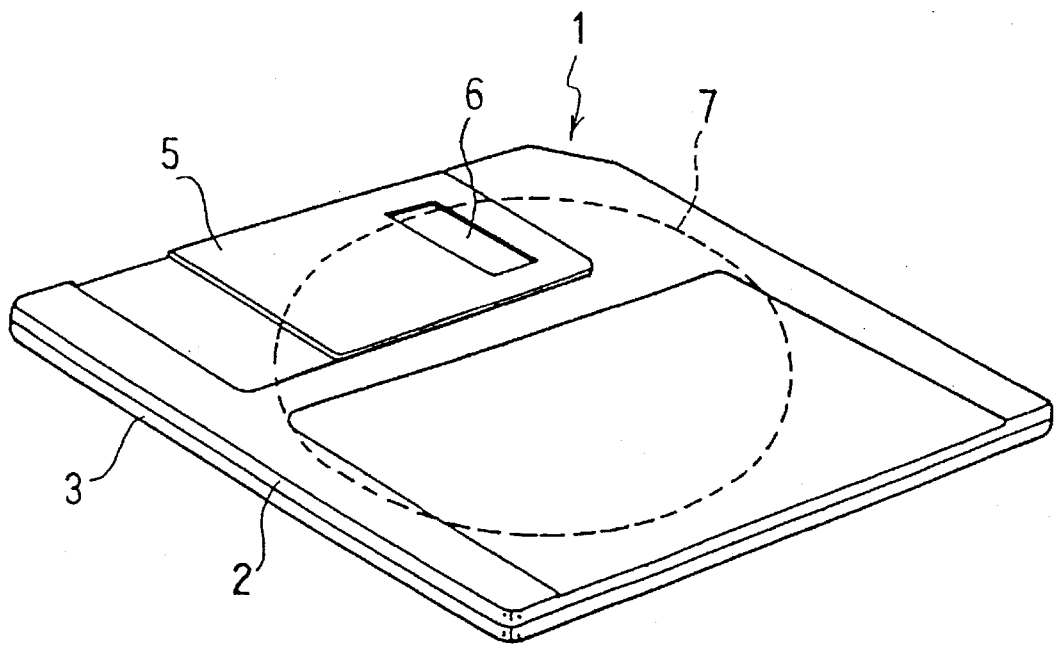
FIG. 1 is a perspective view of a magnetic disk cartridge of the present invention.
Figure 2:
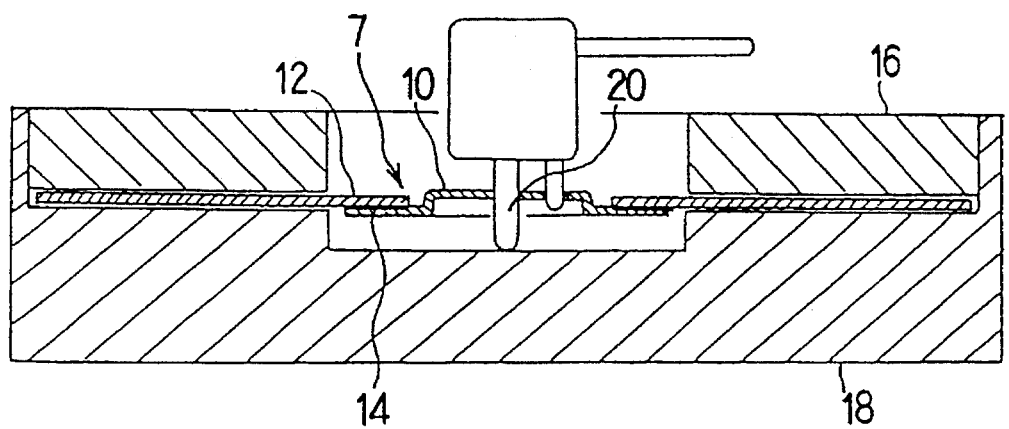
FIG. 2 is a section view of an adhesive strength measuring instrument for the magnetic disk shown in FIG. 1.

As shown in FIGS. 1 and 2, the magnetic disk cartridge according to the present invention is the same as those of the prior art in comprising a cartridge frame 1 and, freely rotatably disposed therein, a magnetic disk 7 comprising a magnetic recording medium 12 and, provided at the center of the medium 12, a hub 10.

However, the magnetic disk cartridge of the present invention is distinguished from the prior art in that the hub 10 is bonded to the medium 12 with a moisture-curable urethane hot-melt adhesive 14.

The magnetic disk cartridge of the present invention will now be described in detail. The cartridge frame 1 is comprised of an upper shell 2 and a lower shell 3, in which a magnetic disk 7 is rotatably disposed. The magnetic disk cartridge is provided with a slide shutter 5 which clamps the upper shell 2 and the lower shell 3. The shutter 5 has a window 6. The magnetic disk 7 touches at a head of a device through the window 6. The lower shell 3 has, in the center thereof, a circular opening (not shown) into which the spindle of the device is inserted. At the time of loading, the spindle engages the hub 10 of the magnetic disk 7 through the aperture thereof to rotate the magnetic disk 7.

The hub 10 of the magnetic disk 7 may be prepared by punching a metal plate or by molding of a hard plastic or the like. In this embodiment, the hub 10 is formed of a metal plate. The medium 12 is comprised of a flexible plastic sheet known in the art and a magnetic recording material bonded over a given region of the surface of the sheet. The hub 10 and the medium 12 are bonded together by an adhesive 14. The adhesive 14 is a moisture-curable urethane hot-melt type. The moisture-curable urethane hot-melt adhesive relating to the present invention preferably has a polyester moiety in its molecular chain.

The moisture-curable urethane hot-melt adhesive is cured by the reaction of the polymer having NCO terminal groups with the moisture in the air or an appropriate curing agent. This adhesive is not only cured by heating but also reactive at room temperature, so that the bonding operation is easy to thereby ensure high productivity. The adhesive strength between the hub 10 and the medium 12, after curing, obtained by the moisture-curable urethane hot-melt adhesive according to the present invention is at least 28 kgfcm, preferably 42 kgfcm or more at a temperature of from 23° to 60° C. At the loading of a magnetic disk cartridge in a device, the temperature often easily reaches 60° C. If the high-temperature adhesive strength is 28 kgfcm or more, the magnetic disk 7 works well in a device. Further, the adhesive strength between the hub 10 and the medium 12 just after the assembly thereof is at least 14 kgfcm, preferably 21 kgfcm or more, at 23° C. and 50% RH. When such a high adhesive strength is ensured just after the assembly, the assembly operation smoothly proceeds.

The adhesive strength is determined by the rotational peel strength measurement. In this measurement, first, the medium 12 of a magnetic disk 7 is sandwiched between medium fixtures 16 and 18 as shown in FIG. 2. Subsequently, a shaft 20 for rotational torque measurement is inserted into a spindle aperture of a hub 10. The shaft 20 is rotated to measure the rotational torque at the time of peeling of the hub 10 from the medium 12. The adhesion area on which the hub 10 adheres to the medium 12 is preset at about 0.9 cm$^2$.

In the magnetic disk cartridge having the above structure, the adhesive strength between the hub 10 and the medium 12 of the magnetic disk 7 is excellent not only just after the assembly but also in a high-temperature environment. Accordingly, the rate of inferior assembly is reduced and the resultant products have an excellent heat resistance.

With respect to the magnetic disk according to the present invention and conventional magnetic disks, the adhesive strength between the hub and the medium was evaluated as follows.

EXAMPLE 1

8 mg of a moisture-curable urethane hot-melt adhesive (having a polyester moiety derived from a reactant of adipic acid and 1,6-hexane diol) was applied between the hub and the medium (application area: about 0.9 cm$^2$), and the hub and the medium were bonded together. The rotational peel strength was measured just after the bonding and with respect to the samples prepared by allowing the assembly to stand still first at a temperature of 23° C. in a humidity of 50% RH for 48 hours, and then under the respective conditions specified in Table 1 for 24 hours. The results are given in Table 1.

COMPARATIVE EXAMPLE 1

The so-called A ring was applied between the hub and the medium, and the hub and the medium were bonded together. The rotational peel strength was measured just after the bonding and with respect to the samples prepared by allowing the assembly to stand still first at a temperature of 23° C. in a humidity of 50% RH for 48 hours, and then under the respective conditions specified in Table 1 for 24 hours. The results are given in Table 1.

COMPARATIVE EXAMPLE 2

Substantially the same procedure as that in Comparative Example 1 was repeated, except that a rubber hot-melt adhesive (SEBS hot-melt adhesive) was used. The results are given in Table 1.

COMPARATIVE EXAMPLE 3

Substantially the same procedure as that in Comparative Example 1 was repeated, except that an acrylic two-pack reaction type adhesive was used. The results are given in Table 1.

TABLE 1

| | Ex./Comp. Ex. | | | (kgfcm) |
|---|---|---|---|---|
| | Ex. 1 | Comp. Ex. 1 | Comp. Ex. 2 | Comp. Ex. 3 |
| adhesive strength just after bonding 23° C., 50% RH | 26.6 | 19.6 | 32.2 | 1.4 |
| adhesive strength −5° C. | 47.6 | 33.6 | 57.4 | 49.0 |
| adhesive strength 23° C., 50% RH | 58.8 | 19.6 | 32.2 | 61.6 |
| adhesive strength 60° C., 50% RH | 51.1 | 8.4 | 5.6 | 47.6 |

The magnetic disk cartridge according to the present invention has an adhesive strength between the hub and the medium which is excellent not only just after the bonding thereof but also later while being left in a high-temperature environment, so that the data reading and data writing into the magnetic disk can be made with high reliability.

What is claimed is:

1. A magnetic disk cartridge comprising a cartridge frame and, freely rotatably disposed therein, a magnetic disk comprising a magnetic recording medium and a hub provided at the center of said medium, wherein said hub is bonded to said medium with a moisture-curable urethane hot-melt adhesive, and an adhesive strength between the hub and the medium is 14 kgfcm or more at 23° C. and 50% RH just after assembly thereof, and after curing of the adhesive, the adhesive strength is 28 kgfcm or more at a temperature from 23°–60° C.

2. The magnetic disk cartridge as claimed in claim 1, wherein said hot-melt adhesive is the moisture-curable urethane hot-melt adhesive having a polyester moiety in molecular chain thereof.

3. The magnetic disk cartridge as claimed in claim 2, wherein said polyester moiety is derived from reactants of adipic acid and 1,6-hexane diol.

4. The magnetic disk cartridge as claimed in claim 1, wherein a chemical bond is formed between isocyanate groups of said moisture-curable urethane hot-melt adhesive and active hydrogen present on the surfaces of said medium and said hub.

* * * * *